(12) United States Patent
Wong et al.

(10) Patent No.: US 9,511,528 B2
(45) Date of Patent: Dec. 6, 2016

(54) FABRICATION OF NANOFIBERS AS DRY ADHESIVES AND APPLICATIONS OF THE SAME

(71) Applicant: The University of Akron, Akron, OH (US)

(72) Inventors: Shing-Chung Josh Wong, Copley, OH (US); Johhny F. Najem, Okaibe (LB); Pei Chen, Beijing (CN)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 14/419,358

(22) PCT Filed: Aug. 6, 2013

(86) PCT No.: PCT/US2013/053807
§ 371 (c)(1),
(2) Date: Feb. 3, 2015

(87) PCT Pub. No.: WO2014/025793
PCT Pub. Date: Feb. 13, 2014

(65) Prior Publication Data
US 2015/0174806 A1    Jun. 25, 2015

Related U.S. Application Data

(60) Provisional application No. 61/679,818, filed on Aug. 6, 2012.

(51) Int. Cl.
| | | |
|---|---|---|
| B32B 37/00 | (2006.01) | |
| B29C 47/00 | (2006.01) | |
| D01D 5/00 | (2006.01) | |
| D04H 1/728 | (2012.01) | |
| D04H 1/74 | (2006.01) | |

(Continued)

(52) U.S. Cl.
CPC ........... *B29C 47/0004* (2013.01); *D01D 5/003* (2013.01); *D01D 5/0007* (2013.01);
(Continued)

(58) Field of Classification Search
CPC ..... B32B 37/00; D01D 5/0007; D01D 5/0015; D01D 5/0023; D01D 5/003; D01D 5/0038; D01D 5/0046; D04H 3/005
(Continued)

(56) References Cited

U.S. PATENT DOCUMENTS 3,562,804 A    2/1971  Powers
4,287,251 A *  9/1981  King ..................... B32B 5/08
                                                           428/198

(Continued)

OTHER PUBLICATIONS

Shi, et al., Do Electrospun Polymer Fibers Stick, Langmuir, 2010, vol. 26(17), pp. 14188-14193.

*Primary Examiner* — Leo B Tentoni
(74) *Attorney, Agent, or Firm* — Renner Kenner Greive Bobak Taylor & Weber

(57) ABSTRACT

A method of forming a dry adhesive by includes forming an electrospun non-woven of a spinnable polymer, wherein the polymer fiber forming the non-woven is aligned. A dry adhesive is provided that comprises aligned polymeric nanofibers. The polymeric nanofibers may be formed from a mixture of highly spinnable material is combined with an adhesive component to further enhance the adhesion onto substrates. The non-woven can further be processed by plastic deformation to create microprotrusions.

16 Claims, 10 Drawing Sheets

(51) Int. Cl.
  *D01F 1/10* (2006.01)
  *D01F 6/44* (2006.01)
  *D01F 6/88* (2006.01)
  *B29K 35/00* (2006.01)
  *B29L 7/00* (2006.01)

(52) U.S. Cl.
  CPC ......... *D01D 5/0023* (2013.01); *D01D 5/0038* (2013.01); *D01F 1/10* (2013.01); *D01F 6/44* (2013.01); *D01F 6/88* (2013.01); *D04H 1/728* (2013.01); *D04H 1/74* (2013.01); *B29K 2035/00* (2013.01); *B29L 2007/00* (2013.01); *D10B 2331/02* (2013.01); *Y10T 442/609* (2015.04); *Y10T 442/643* (2015.04)

(58) Field of Classification Search
  USPC ......... 264/103, 464, 465, 466, 484; 156/167
  See application file for complete search history.

(56) References Cited

U.S. PATENT DOCUMENTS

| | | | |
|---|---|---|---|
| 6,872,439 B2 | 3/2005 | Fearing et al. | |
| 7,479,198 B2 | 1/2009 | Guffrey et al. | |
| 8,142,700 B2 | 3/2012 | Sitti et al. | |
| 8,206,631 B1 | 6/2012 | Sitti et al. | |
| 8,398,909 B1 | 3/2013 | Sitti et al. | |
| 8,428,675 B2 | 4/2013 | McKenna | |
| 2004/0203306 A1* | 10/2004 | Grafe | A47L 13/16 442/189 |
| 2004/0206448 A1 | 10/2004 | Dubrow | |
| 2006/0194496 A1* | 8/2006 | Burns | B32B 5/022 442/381 |
| 2007/0051465 A1* | 3/2007 | Naughton | B29C 66/712 156/305 |
| 2007/0261458 A1 | 11/2007 | Oruganti et al. | |
| 2008/0292840 A1 | 11/2008 | Majumdar et al. | |
| 2009/0011232 A1 | 1/2009 | Dai et al. | |
| 2009/0253806 A1 | 10/2009 | Varshney et al. | |
| 2010/0086785 A1* | 4/2010 | Perry | B29C 70/64 428/412 |
| 2010/0136281 A1 | 6/2010 | Sitti et al. | |
| 2010/0327494 A1* | 12/2010 | Jabbari | D04H 3/005 264/466 |
| 2011/0117321 A1* | 5/2011 | Menon | B29C 33/3878 428/156 |
| 2013/0197663 A1* | 8/2013 | MacEwan | A61L 15/22 623/23.72 |

\* cited by examiner

FABRICATION OF NANOFIBERS AS DRY ADHESIVES AND APPLICATIONS OF THE SAME

CROSS-REFERENCE TO RELATED APPLICATION

The present application claims priority to U.S. Provisional Patent Application No. 61/679,818, filed Aug. 6, 2012, incorporated herein by reference.

This invention was made with government support under National Science Foundation CMMI-0746703, IIP 1246773 and IIP 1315174. The government has certain rights in the invention.

FIELD OF THE INVENTION

The present invention relates methods of forming dry adhesives from electrospinning spinnable materials. The present invention further relates to a method of forming a dry adhesive from aligned, electrospun nanofibers.

BACKGROUND OF THE INVENTION

Hierarchical structures of fine fibrils on insect's feet induce strong molecular forces and provide extraordinary adhesive strength, enabling them to support large loads. Such dry adhesion allows, for example, the gecko's locomotion on slippery surfaces against gravity as well as firmly attach onto and detach with ease from rough substrates. Presently, polymer micro/nano fibrillar dry adhesives are known to be made using micro/nano fabrication processes. These techniques are common in microfabrication and often require expensive equipment and are costly to implement on a commercial scale.

This invention makes use of a drastically different approach to manufacture flexible, fibrillar, and adhesive microprotrusion and adhesive laid-flat membranes by scalable nozzle-free electrospinning, which presents novel approaches to fabricating dry, removable, reusable adhesives on substrates. The invention differs drastically from other disclosed technologies, which are based on the use of aligned carbon nanotubes, photolithography, chemical etching, and time-consuming batch micro/nano molding processes. The new methodology offers advantages of significantly lower costs and easier scale-up, which will replace the more expensive approaches such as micro/nano fabrication process. Introduction of nozzleless electrospinning polymer blending and equal-channel angular pressing will combine processing stages such as solution preparation, spinning and spin-finish in one production line, significantly reducing processing time and costs.

Although some of these spinning methodologies are known in the art, one of the inventors, Shing-Chung Wong, led the first group to examine electrospun nanofibers and membranes for their adhesion strength and energy and thus their applications as dry adhesives. Measurement of Adhesion Work of Electrospun Polymer Membrane by Shaft-Loaded Blister Test, Langmuir Vol. 28 (2012) 6677-6683; A Nano-Cheese-Cutter to Directly Measure Interfacial Adhesion of Freestanding Nano-Fibers, Journal of Applied Physics Vol. 111, (2012); Mechanism of Adhesion Between Polymer Fibers at Nanoscale Contacts, Langmuir Vol. 28 (2012) 4663-4671; and Do Electrospun Polymer Fibers Stick?, Langmuir, Vol. 26 (2010) 14188-14193.

An adhesive is a kind of material that can bond items together. Adhesives are typically liquid or semi-liquid, with the earliest adhesives being made of natural materials, such as tree sap, beeswax, tar and etc. Advances in the science and understanding of adhesive mechanisms have led to more and more adhesive formulations. Today's adhesives can be classified in many different ways, generally by their bonding mechanism, with three major categories including: physically hardening adhesives, chemically curing adhesives and pressure sensitive adhesives.

Physically hardening adhesives are non-reactive adhesives, and they are in their final chemical state before applying to surface. Only polymers that can be liquefied, either melt or dissolved, can be used for physical hardening adhesives. Physically hardening adhesives provide a wide range of adhesive properties, generally good bond flexibility, and are used in a variety of applications.

There are three major types of hardening adhesives: (i) hot melts, (ii) solvent based adhesives and (iii) polymer dispersion adhesives. Most of the hot melt adhesives are thermoplastics, which can be applied in molten form in the range of 65° C.-180° C. They can be solidified in room temperature to form strong bonding with various materials. Ethylene-vinyl acetate (EVA) is a particularly common hot melt adhesive. EVA possesses good physical properties, such as good clarity, low-temperature toughness, stress-crack resistance, water resistance, UV resistance etc. Solvent based adhesives build strength through the evaporation of the solvent. The performance of solvent-based adhesives is largely determined by the polymer system in the formulation. The choice of adhesive type depends on the specific substrates and environmental resistance needed—temperature resistance, oil and plasticizer resistance, etc. Polymer dispersion adhesives are typically formulated from compounds including vinyl acetate polymers and copolymers (PVAC), ethylene vinyl acetate (EVA), acrylics, styrene-butadiene rubber (SBR), natural rubber latex and synthetic elastomers, and polyurethane (PUR). These adhesives are heterogeneous systems comprising a solid polymer phase dispersed in an aqueous phase.

One of the major advantages is the absence of VOC's. For many water based adhesives, it is a requirement that at least one of the substrates be permeable to allow water to escape from the system. It is not surprising, then, that these materials have found wide use in bonding wood, paper, fabrics, leather and other porous substrates.

Chemically curing adhesives are reactive materials that require chemical reaction to convert them from liquid to solid. Generally they can be classified in to single component adhesives and two component adhesives. Single component adhesives have pre-mixed adhesive components which are blocked normally. Only when the required condition was met, they will activate the hardener. These conditions could be heat, moisture, radiation, etc. Two component adhesives have two reactive components which can form solid systems after mixing them. The most widely used two component adhesives include epoxies, methyl methacrylates (MMA), silicones, etc.

Cyanoacrylates are known for their "instant" bonding to most surfaces. When a drop of cyanoacrylate adhesive is put on the surface of a part, the acid stabilizer molecules react with the water molecules present on the surface of the part from the relative humidity in the air. The reaction of the water and acid causes the acid stabilizer to be neutralized. The cyanoacrylate molecules then react with each other and form polymer chains without cross-linking. Cyanoacrylates can bond most types of glass, plastics and metals, and has broad application in optics, microelectronics, transportations and medical industries, etc.

Single-component epoxy adhesives include solvent-free liquid resins, solutions in solvent, liquid resin pastes, fusible powders, sticks, pellets and paste, supported and unsupported films, and preformed shapes to fit a particular joint. Two-component epoxy adhesives are usually composed of the resin and the curing agent, which are mixed just prior to use. The components may be liquids, putties, or liquid and hardener powder. They may also contain plasticizers, reactive diluents, fillers, and resinous modifiers. The processing conditions are determined by the curing agent employed.

Typical cure conditions range from 3 h at 60° C. to 20 min at 100° C. Epoxy adhesives form strong bonds to most materials, in addition to excellent cohesive strength, but are not reusable and irremovable, and residue is left on cohesively fractured surfaces. Epoxies yield good to excellent bonds to steel, aluminum, brass, copper, and most other metals but are brittle and fracture usually with cohesive failure mode.

Pressure sensitive adhesives (PSA's) are most used in tape and label industry. PSA's are typically formulated from natural rubber, certain synthetic rubbers, and polyacrylates. PSA's form a bond simply by the application of pressure to marry the adhesive with the adherend. Once the adhesive and the adherend are in proximity, there are also molecular interactions such as van der Waals forces involved in the bond, which contribute significantly to the ultimate bond strength. PSA's exhibit viscoelastic (viscous and elastic) properties, both of which are used for proper bonding. Pressure sensitive adhesives are designed with a balance between flow and resistance to flow. The bond forms because the adhesive is soft enough to flow the adherend. The bond has strength because the adhesive is hard enough to resist flow when stress is applied to the bond. Since these adhesives are not true solids, the strength of pressure sensitive adhesives decreases when the temperature is increased. PSA's also exhibit a tendency to undergo creep when subjected to loads.

There is a growing demand in the art of removable, reusable and dry adhesives. Typically, dry reusable adhesives produce substantial shear adhesion strengths but significantly lower normal lifting forces, giving rise to high anisotropic adhesion properties. Dry adhesives with anisotropic force distribution may find potential use in several applications such as tapes, fasteners, treads of wall-climbing robots, wall-climbing suits, microelectronics, and medical and space applications.

Dry adhesives have been fabricated using polymers, which has resulted in high shear adhesion strength, by forming tens of millions of contact points between adhesive and adherend. Carbon nanotube (CNT) based arrays possess a shear adhesion strength as high as 100 N/cm$^2$ on a glass slide. These arrays have high aspect ratios and mechanical strengths. However, a significant normal preload of 50 N/cm$^2$ is required to achieve this shear adhesion force. CNT arrays have considerable limitations including being electrically conductive for applications necessitating electrically insulating adhesives. These arrays also possess a low ratio of shear adhesion strength to normal detachment strength (V) which limits their range of applications.

Hierarchical pillars have been fabricated in polydimethysiloxane where the top rounded pillars are 10 μm in diameter with aspect ratios ranging between 0.5 and 2. The base pillars are 200 μm in length and 50 μm in diameter. Hierarchical nanofiber-based structures have been developed using polymethylmethacrylate by chronologically employing two porous alumina templates. The adhesion strength in this hierarchical structure is also severely low. The heavily packed pillars cause clumping in the structure, which is suggested to lead to this deteriorated adhesion. None of the prior art made use of fiber spinning methodologies to form the adhesives.

High aspect ratio (AR) structures exhibit significant shear adhesion strength compared to ones with low AR's. Various techniques have been employed to fabricate moderate AR structures including nanomolding, e-beam lithography, and replication of nanoporous membranes with polymers. The methodologies are costly to be scaled up for mass production.

Thus, there is a need in the art for improved methods of forming dry adhesives from electrospinning spinnable materials. There is also a need in the art for dry adhesives with high shear adhesion strength and low normal detachment.

SUMMARY OF THE INVENTION

In a first embodiment, the present invention provides a method for producing a dry adhesive, the method comprising the steps of providing a spinnable material, electrospinning the spinnable material to form a non-woven, wherein the non-woven comprises nanofibers, where said nanofibers are substantially aligned in a parallel alignment.

In a second embodiment, the present invention provides a method as in the first embodiment, wherein the spinnable material is a solution of a polymeric material and a solvent.

In a third embodiment, the present invention provides a method as in either the first or second embodiment, wherein the polymeric material is selected from the group consisting of polyurethanes, polycaprolactones, polyvinyl alcohols, poly(vinyldiene fluoride)s, polyamides, polybenzimidazoles, polycarbonates, polyacrylonitriles, polylactic acids, polyethylene oxides, polyethylene terephtalates, polystyrenes, polyvinylphenols, polyvinylchlorides, cellulose acetates, polyether imides, polyethylene glycols, poly(ferrocenyldimethylsilane)s and mixtures thereof.

In a fourth embodiment, the present invention provides a method as in any of the first through third embodiments, wherein the solvent is selected from the group consisting of toluene, tetrahydrofuran, dichloromethane, chloroform, methanol, dimethylacetamide, dimethyl sulfoxide, dimethylformamide, xylene, acetone, ethanol, formic acid, distilled water, trifluoroacetic acid, hexafluoro-2-propanol and mixtures thereof.

In a fifth embodiment, the present invention provides a method as in any of the first through fourth embodiments, wherein the solution further includes an adhesive component, the adhesive component being a viscoelastic or a resin-curable component.

In a sixth embodiment, the present invention provides a method as in any of the first through fifth embodiments, wherein the adhesive component has a Young's modulus of 0.1 GPA or less.

In a seventh embodiment, the present invention provides a method as in any of the first through sixth embodiments, wherein the adhesive component is flowable at room temperature.

In an eighth embodiment, the present invention provides a method as in any of the first through seventh embodiments, wherein the adhesive component is selected from the group consisting of polyisobutylenes, pressure sensitive adhesive materials and tackifiers.

In a ninth embodiment, the present invention provides a method as in any of the first through eighth embodiments, wherein the adhesive component is selected from the group consisting of polyisobutylene, acrylics, butyl rubber, ethylene-vinyl acetate (EVA) with high vinyl acetate content, natural rubber, nitriles, silicone rubbers, styrene block copolymers (SBC), styrene-butadiene-styrene (SBS), styrene-ethylene/butylene-styrene (SEBS), styrene-ethylene/propylene (SEP), styrene-isoprene-styrene (SIS), vinyl ethers, and mixtures thereof.

In a tenth embodiment, the present invention provides a method as in any of the first through ninth embodiments, wherein the adhesive component is selected from the group consisting of rosins, rosin derivates, terpenes, modified terpenes, aliphatic, cycloaliphatic and aromatic resins (C5 aliphatic resins, C9 aromatic resins, and C5/C9 aliphatic/aromatic resins), hydrogenated hydrocarbon resins, terpene-phenol resins (TPR), and mixtures thereof.

In an eleventh embodiment, the present invention provides a method as in any of the first through tenth embodiments, wherein the dry adhesive has a shear adhesion strength that is higher than the normal adhesion strength.

In a twelfth embodiment, the present invention provides a method as in any of the first through eleventh embodiments, wherein the method further comprises the step of subjecting the non-woven to plastic deformation.

In a thirteenth embodiment, the present invention provides a method as in any of the first through twelfth embodiments, wherein said step of subjecting the non-woven to plastic deformation includes passing the non-woven through an equal channel angular extrusion vial.

In a fourteenth embodiment, the present invention provides a dry adhesive, the dry adhesive comprising a non-woven fabric of electrospun polymeric nanofibers substantially aligned in a parallel alignment.

In a fifteenth embodiment, the present invention provides a method as in the fourteenth embodiment, wherein the average diameter of the nanofibers is from 50 nanometers to 500 nanometers.

In a sixteenth embodiment, the present invention provides a method as in either the fourteenth or fifteenth embodiment, wherein the average diameter of the nanofibers is from 270 nanometers to 400 nanometers, the thickness of the dry adhesive is about 10 μm, and the work of adhesion is from 180 mJ/m$^2$ to 350 mJ/m$^2$.

In a seventeenth embodiment, the present invention provides a method as in any of the fourteenth through sixteenth embodiments, wherein the average diameter of the nanofibers is from 50 nanometers to 300 nanometers, the thickness of the dry adhesive is from 15 μm to 100 μm, and the shear adhesion strength is about 27 N/cm$^2$.

In an eighteenth embodiment, the present invention provides a method as in any of the fourteenth through seventeenth embodiments, wherein the dry adhesive has a shear adhesion strength that is higher than the normal adhesion strength.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

The present invention relates to a method of forming a dry adhesive by engineering an electrospun non-woven of a highly spinnable polymer, wherein the polymer fiber forming the non-woven is aligned. The present invention further relates to a method of forming a dry adhesive from aligned, electrospun nanofibers. In one or more embodiments, a dry adhesive is provided that comprises aligned polymeric nanofibers. In some such embodiments, the spinnable solution is combined with an adhesive component to further enhance the adhesion onto substrates. In some embodiments, the non-woven is electrospun form a polymer solution including a small amount of low modulus adhesive component.

In one or more embodiments, microprotrusions are formed by electrospinning polymeric nanofiber structures and thereafter subjecting the structures to conforming to surface asperities. In some such embodiments, the spinnable solution is combined with an adhesive component to further augment the adhesion onto substrates.

The dry adhesive having aligned polymeric nanofibers and method of making will now be described in greater detail. It should be noted that the specific materials and the specific process conditions disclosed in the following disclosures are given only as examples within the scope of the invention, and this invention should not be limited to these materials or process conditions as such.

Electrospinning is employed to create non-woven fabrics of nanofibers that can serve as dry adhesives. The electrospinning process is generally well known. A voltage is applied to a spinnable liquid held in a spinning tip or spinneret (typically similar to a syringe or needle) directed toward a grounded collector. Electrostatic repulsion counteracts the surface tension of the liquid at the tip and a Taylor cone forms from which a stream of liquid (or jet) erupts toward the collector. The jet elongates and collects on the collector as nanofibers, i.e., fibers with nanometer scale diameters. The collection is typically termed a non-woven fabric, as the nanofibers overlap and collect in a sheet-like form.

Electrospun fibers with good alignment exhibit significant improvement in adhesion strength compared to bulk materials.

In some embodiments of the present invention, specific electrospinning apparatus are used to encourage the formation of non-woven fabrics having aligned nanofibers. The nanofibers can be aligned using a rotating collector or a parallel electrodes collector. The rotating collector is typically cylindrically shaped, although any shapes known in the art can be utilized. The rotating collector can be a drum or a disc.

Figure 1:
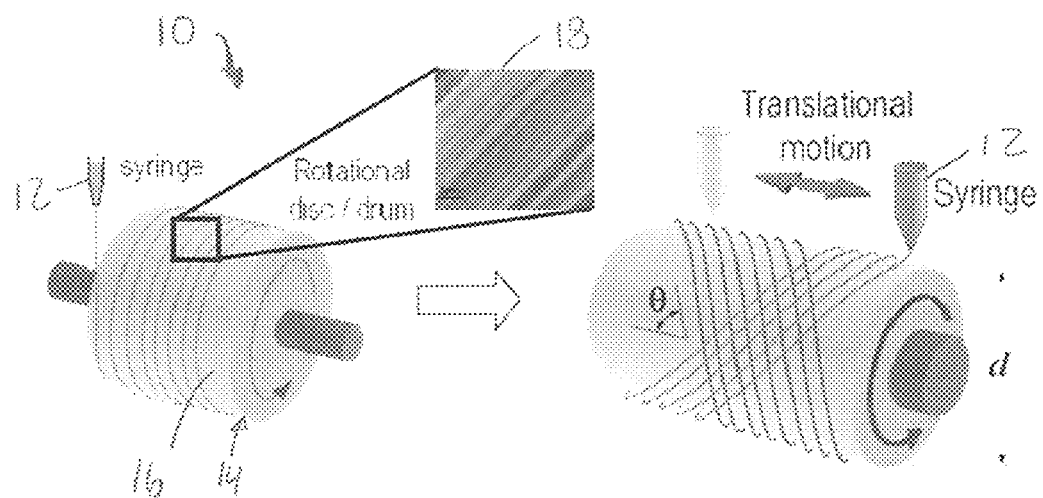
FIG. 1 is a schematic showing an electrospinning apparatus where a disc or drum is used for creating non-woven fabrics with aligned nanofibers.

Referring now to FIG. 1, an electrospinning apparatus for creating non-woven fabrics with aligned nanofibers is shown and designated by the numeral 10. The apparatus 10 includes a spinneret 12 holding the spinnable liquid for electrospinning. The spinneret is directed toward a drum or disc collector 14 providing a peripheral collecting surface 16. The designation as a drum collector typically relates to the collector having a collecting surface 16 that is of a more substantial axial length, whereas designation as a disc collector typically relates to the collector having a very narrow collecting surface, i.e., a more sharp edge. Generally, the advantage of utilizing a rotating disc collector compared to the rotating drum collector is that most of the fibers are collected in an aligned fashion on the sharp-edged disc.

The disc or drum collector 14 rotates as the jet of charged liquid is drawn toward the collecting surface, and, as a result, the collected fiber tends to align in the direction of rotation. In some embodiments, such as that shown to the right in FIG. 1, the spinneret 12 moves back a forth across the axial length of the collecting surface to achieve a more helical winding of the nanofibers and create a non-woven with aligned fibers in a helical arrangement. In either embodiment, the rotational collector rotates and the nanofibers form in such a way that the nanofibers are aligned to be substantially parallel with other nanofibers as the rotational collector rotates. It will be appreciated that the alignment is general in nature and not absolute perfect alignment as the jet collecting on the collecting surface bends and whips back and forth to some degree under what is known as bending instability. Nevertheless the collected fibers are understood as being aligned as opposed to randomly collected. This is shown in FIG. 1 at the electron micrograph 18 therein, which shows aligned nanofibers.

In the method of utilizing a rotating drum collector, the diameter of the nanofiber can be controlled through the take-up velocity (TUV) of the drum. The alignment of the fibers is induced by the rotating drum and the degree of fiber alignment improves with the rotational speed. Randomly oriented fibers are obtained on the drum at TUV lower than the fiber TUV. At higher TUV, the fibers extend before being collected on the drum due to a centrifugal force which is developed on the surface of the rotating drum.

Figure 2:
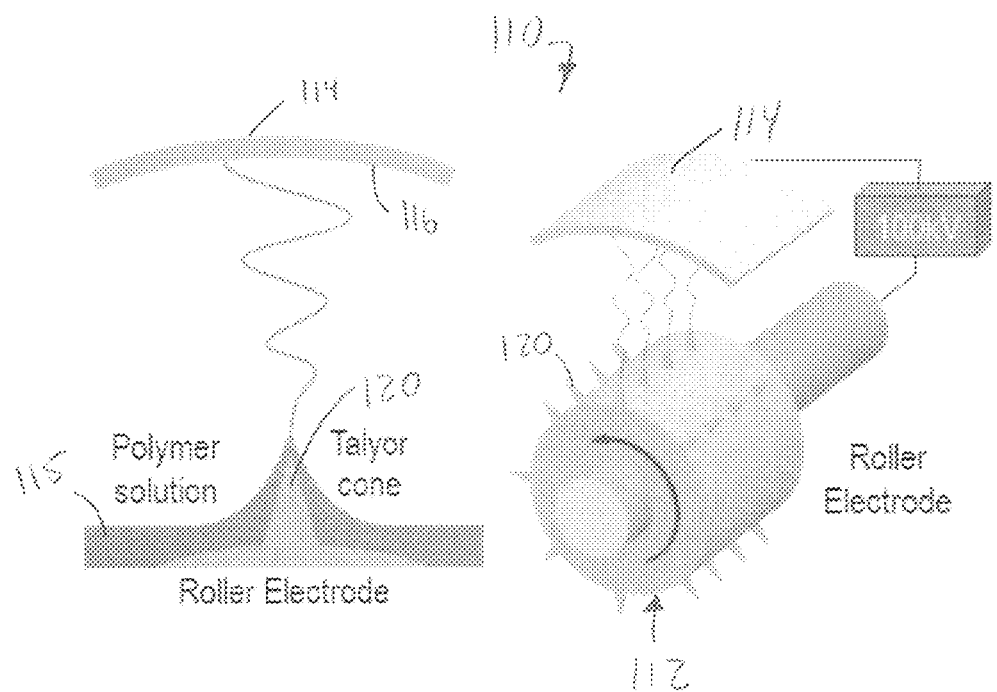
FIG. 2 is a schematic showing an electrospinning apparatus for creating non-woven fabrics with aligned nanofibers, the apparatus having a roller electrode that includes a multitude of protrusions.

Referring now to FIG. 2, an electrospinning apparatus for creating non-woven fabrics with aligned nanofibers is shown and designated by the numeral 110. This embodiment employs a roller electrode 112, serving a similar function as compared to the spinneret of the prior apparatus. The roller electrode 112 rotates (as generally shown by the rotational arrow in the figure) partially submerged in a spinnable solution 115 and underneath a collector 114. The roller electrode 112 includes a multitude of protrusions 120, which become coated with the spinnable solution 115. The electrode is charged to charge the spinnable solution so that Taylor cones form and the spinnable solution jets to the collector. Because the roller electrode is rotated, the fiber is drawn and aligned. The collector 114 can be curved to retain a consistent distance between the tips of the protrusions 120 and the collecting surface 116 of the collector 114. The collector 114 can be made to rotate as well to draw fibers and further enhance alignments.

Figure 3:
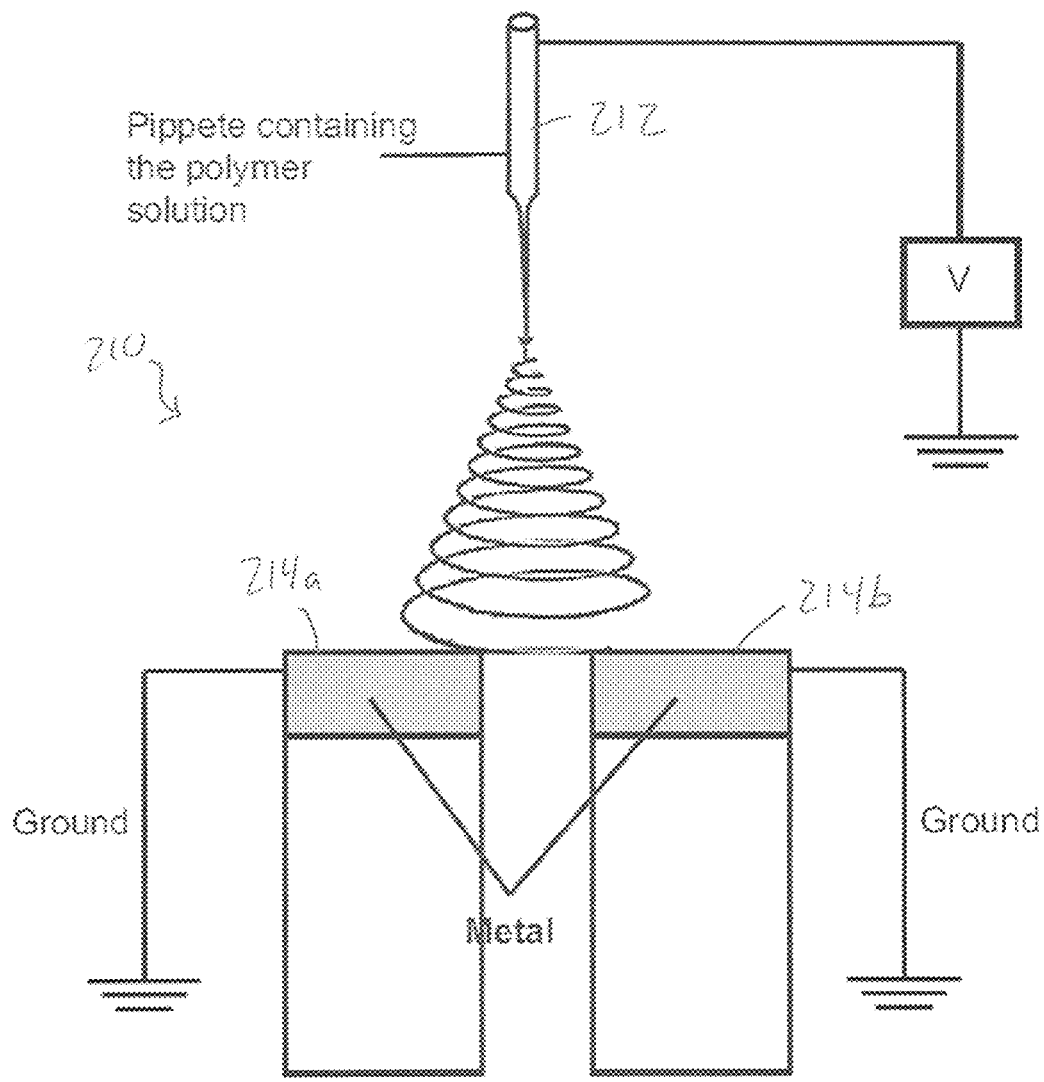
FIG. 3 shows a general schematic of a static parallel electrode electrospinning apparatus.

Referring now to FIG. 3, a static parallel electrode electrospinning apparatus is shown and designated by the numeral 210. The apparatus 210 includes a collector in the form of first and second collector electrodes 214a, 214b, and the spinneret 212. Nanofibers are collected across an air gap between the first and second collector electrodes 214a, 214b. An electric field produced between the electrodes causes fibers to align perpendicular to the electrodes. The fibers are stretched as they form. The advantage of this method is that the setup is simple. Also, it is easy to collect single fibers and several aligned fibers for mechanical testing.

The spinnable liquid can be a liquid or melt or solution. In some embodiments, the spinnable liquid is polymeric. Most polymers can be dissolved in suitably selected solvents. In some embodiments, the spinnable liquid is a polymer solution comprising a highly spinnable polymer carried in an appropriate solvent at an overall viscosity suitable for electrospinning.

In some embodiments, the spinnable polymer is selected from polyurethanes (PU), polycaprolactones (PCL), polyvinyl alcohols (PVA), poly(vinyldiene fluoride)s (PVDF), polyamides (PA), polybenzimidazoles (PBI), polycarbonates (PC), polyacrylonitriles (PAN), polylactic acids (PLA), polyethylene oxides (PEO), polyethylene terephtalates (PET), polystyrenes (PS), polyvinyphenols (PVP), polyvinylchlorides (PVC), cellulose acetates (CA), polyether imides (PEI), polyethylene glycols (PEG), poly(ferrocenyldimethylsilane)s (PFDMS), and mixtures thereof.

Thus, in some embodiments, the spinnable liquid is a polymer solution formed from one or more polymers dissolved in one or more solvents to form an appropriate compound for adhesion enhancement. The particular polymer(s) and solvent(s) are chosen based on the corresponding properties of each. In one or more embodiments, two or more solvents are used in the spinnable liquid to produce synergistic effects.

Suitable solvents will be appreciated as useful for particular polymers. In accordance with the list of polymers provided above suitable solvent can be chosen from toluene, tetrahydrofuran (THF), dichloromethane (DCM), chloroform ($CHCl_3$), methanol, dimethylacetamide (DMAC), dimethyl sulfoxide (DMSO), dimethylformamide (DMF), xylene, acetone, ethanol, formic acid, distilled water, trifluoroacetic acid, hexafluoro-2-propanol, and mixtures thereof.

In one or more embodiments, the polymer or polymers are present in the polymer solution at a concentration suitable for providing acceptable solution properties (viscosity, conductivity and surface tension) suitable for successful electrospinning. The molecular weight and molecular weight distribution and architecture of the polymer can also be varied to achieve a desired electrospinning.

In some embodiments, the polymer or polymers are present in the polymer solution at a percentage of from 1 wt % or more to 30 wt % or less. In some embodiments, the polymer or polymers are present in the polymer solution at a concentration of from 3 wt % or more to 25 wt % or less, in other embodiments, from 5 wt % or more to 20 wt % or less.

The viscosity of the solution influences its spinnability. Controlling the viscosity of a solution is generally known in the art. A solution that is too viscous, and a solution that is not viscous enough, cannot be spun.

In some embodiments, the highly spinnable solution are selected from any one or more of the following:

(i) nylon 6,6 dissolved in formic acid with a concentration 5-20 wt %;

(ii) polyurethanes dissolved in dimethyl formamide with a concentration of 5-20 wt %;

(iii) polybenzimidazole (PBI) dissolved in dimethyl acetamide with a concentration 5-10 wt. %;

(iv) polycarbonate dissolved in dimethyl formamide:tetrahydrofuran with a concentration 5-10 wt. %;

(v) polycarbonate dissolved in dichloromethane with a concentration 5-20 wt. %;

(vi) polyacrylonitrile (PAN) dissolved in dimethyl formamide with a concentration of 5-20 wt. %;

(vii) polyvinyl alcohol (PVA) dissolved in distilled water with a concentration of 1-16 wt. %;

(viii) polylactic acid (PLA) dissolved in dichloromethane with a concentration 1-15 wt %;

(ix) polyethylene oxide (PEO) dissolved in distilled water with a concentration of 4-10 wt %;

(x) polyethylene terephthalate, PET; dissolved in dichloromethane and trifluoracetic acid with a 12-18 wt %;

(xi) polystyrene (PS) tetrahydrofuran with a concentration 1-25 wt % (xi) polyvinyl phenol, PVP dissolved in tetrahydrofuran with a concentration in 20-60% (wt./vol.);

(xii) polyvinylchloride, PVC; (tetrahydrofuran/dimethylformamide) with 10-15 wt %;

(xiii) cellulose acetate, CA dissolved in acetone and acetic acid, dimethylacetamide; with concentration of 12.5-20%;

(xiv) poly(vinylidene fluoride) PVDF; dimethylformamide:dimethylacetamide with a concentration 20 wt. %;

(xv) polyether imide, PEI; dissolved in hexafluoro-2-propanol in a concentration of 10 wt. %; and (xvi) polyethylene glycol (PEG) dissolved in chloroform with a concentration of 0.5-30 wt % poly(ferrocenyldimethylsilane), (xvii) PFDMS dissolved in tetrahydrofuran:dimethylformamide with a concentration of 5-30 wt. %.

Electrospinning under generally known methods onto the apparatus as disclosed above yields non-woven fabrics of aligned nanofibers. The surfaces of the non-woven fabric are defined by millions of generally aligned nanofibers, as generally seen in the inset image of FIG. 1. The nanofibers, being of such nanoscopic diameters, are able to conform readily to surface asperities and serve as contact points with not only the macroscopic but also the micro- and nanoscopic asperities on the surface of an adherend.

The aligned nanofibers possess great membrane flexibility, which allows the fibers to conform to surface asperities, thereby producing intermolecular interactions such as van der Waals forces that secure the non-woven to the surface of the adherend. Thus the non-woven can serve as a dry adhesive, adhering to the surface of an adherend and, in some embodiments, further securing the adherend to another surface.

In one or more embodiments, a dry adhesive having a hierarchical structure is produced. The adhesion performance of hierarchical structure adhesives is expected to be superior to adhesives lacking hierarchical structures. This is because enhanced packing density augments van der Waals forces between fibers arrays and a substrate, which increases the shear adhesion strength between the hierarchical structure and the substrate.

The hierarchical structures can be produced, for example, by passing aligned electrospun fibers through an equal channel extrusion vial.

The architecture of non-woven and the fibers thereof should be tailored to be comparable to the dimensions of surface asperities and the topology of the target adherend. When the asperities are smaller, smaller fiber diameters and filaments are generally desired.

Certain properties of the nanofibers can be controlled in order to tailor the adhesion strength. These properties include fiber diameter (d) and fiber surface roughness. The properties of a non-woven that is formed from the nanofibers can also be controlled in order to tailor the adhesion strength. These properties include bending stiffness (b), non-woven thickness (T), loading angle, and molecular orientation. The properties of both the fibers and the non-wovens can have an effect on the adhesion strength and friction coefficient ($\mu$) of the arrays.

Generally, as the fiber diameter decreases, the bending moment and thus bending stiffness decrease. Similarly, as the fiber diameter increases, the bending moment and thus bending stiffness increase. The bending stiffness of the non-woven critically influences the shear adhesion strength measured.

In some embodiments, the fiber diameter is less than or equal to 10 microns. In other embodiments, the fiber diameter is less than or equal to 1 microns, in other embodiments, the fiber diameter is less than or equal to 500 nanometers, in other embodiments, the fiber diameter is less than or equal to 100 nanometers, and in other embodiments, the fiber diameter is less than or equal to 50 nanometers. In one or more embodiments, the fiber diameter is from 50 nanometers or more to 500 nanometers or less.

Figure 4:
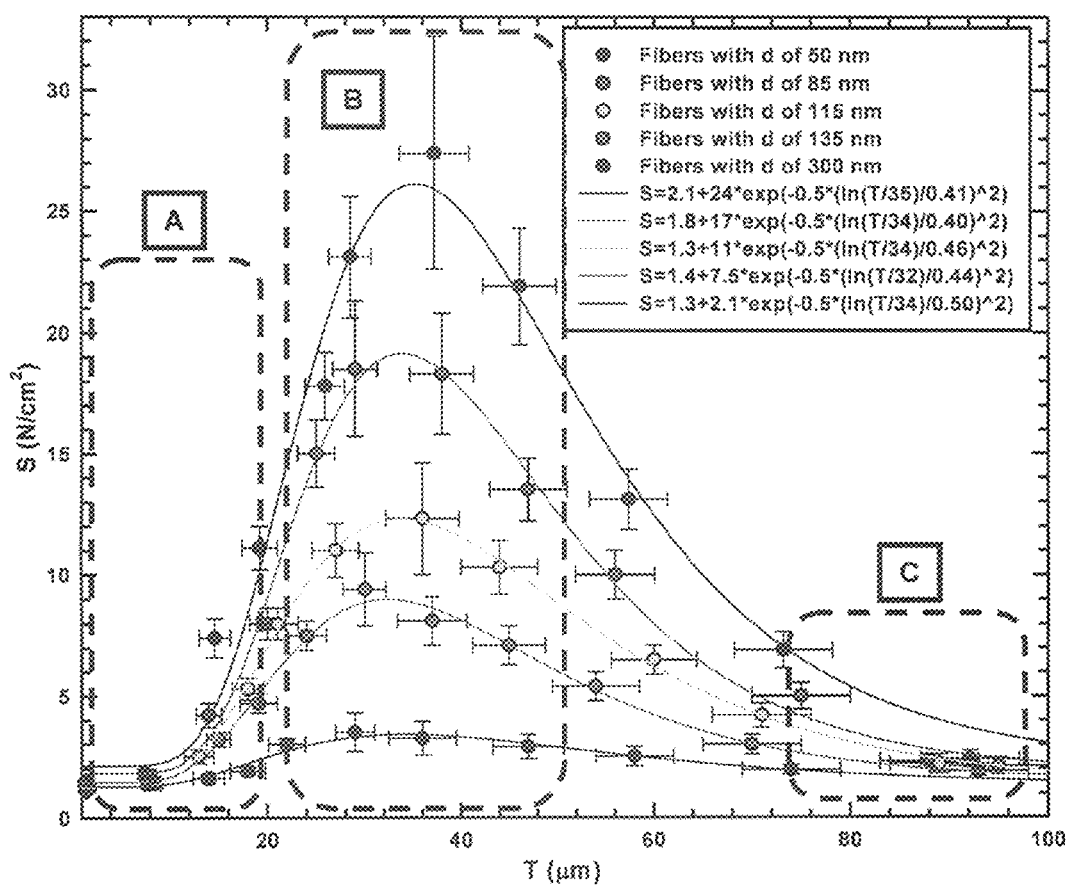
FIG. 4 is a graph showing shear adhesion strength as a function of T and fiber diameter for aligned fiber membranes attached onto a glass slide.

FIG. 4 shows one example of the effect of fiber diameter and non-woven thickness on shear adhesion strength. Each generally parabolic plot represents fibers of different diameters. It can be seen that the fibers of smaller diameter provide higher shear adhesion strength. The smaller diameters allow the fibers to better conform to the asperities on the adherend surface, thus increasing intermolecular interactions such as van der Waals forces. The shear adhesion strength peaks for non-woven thickness, and it is understood that a transition occurs from a plane strain to a plane stress (Polymer Blends; Mai, Wong, and Chen; 2000; which is incorporated herein by reference) such that the thinner non-wovens provide less shear adhesion strength because there is too little ligament to provide for intermolecular interactions such as van der Waals forces. It is further understood that the thicker non-wovens cannot conform to the asperities and thus shear adhesion decreases after a preferred thickness for a given adherend.

Generally, as the non-woven thickness decreases, the bending moment and thus bending stiffness decrease. Similarly, as the non-woven thickness increases, the bending moment and thus bending stiffness increase. The bending stiffness of the non-woven critically influences the shear adhesion strength measured.

Thickness might be optimized for a given non-woven and target adherend. Thinner non-wovens will interact better with increasingly smaller asperities on the surface of the adherend. In one or more embodiments, the non-woven (or membrane) is from 10 micrometers or more to 100 micrometers or less. In other embodiments, the non-woven is from 1 micrometer or more to 10 micrometers or less, in other embodiments, from 0.1 micrometers or more to 1 micrometer or less.

In one or more embodiments, a non-woven is produced from PVDF with a fiber diameter of from 270 nm or more to 400 nm or less, a membrane thickness of about 10 µm, and a work of adhesion from 180 mJ/m$^2$ or more to 350 mJ/m$^2$ or less. In one or more embodiments, a non-woven is produced from PCL with a fiber diameter of from 200 nm or more to 300 nm or less, a membrane thickness of about 10 µm, and a work of adhesion from 260 mJ/m$^2$ or more to 350 mJ/m$^2$ or less.

In one or more embodiments, a non-woven is produced from nylon 6 with a fiber diameter of from 50 nm or more to 300 nm or less, a membrane thickness of from 15 µm or more to 100 µm or less, and a shear adhesion strength of about 27 N/cm$^2$. In these embodiments and other embodiments, the shear adhesion strength of a non-woven substantially increases as the fiber thickness rises from one threshold to a second threshold. After the fiber thickness becomes greater than the second threshold, the shear adhesion strength of a produced non-woven is significantly reduced.

In particular embodiments, as the fiber thickness increases from 15 µm to 40 µm, the shear adhesion strength of the non-woven substantially increases and reaches a maximum value. In these and other embodiments, for thicknesses greater than 40 µm, the shear adhesion strength of a produced non-woven is reduced.

In one or more embodiments, a non-woven is produced from PCL with a fiber radius of from 0.35 µm or more to 1.2 µm or less, and an adhesion energy from 180 mJ/m$^2$ or more to 200 mJ/m$^2$ or less.

Dry adhesives and non-wovens of the present invention have generally higher shear adhesion while also having generally lower normal lifting force. Shear adhesion is the adhesion strength measured in a direction that is coplanar with a cross section of the material, in other words, the adhesion strength measured in a direction that is generally parallel to the surface of the material. Normal lifting force is the adhesion strength measured in a direction that is generally perpendicular with the surface of the material. A large difference between shear adhesion and normal adhesion is desired in order to easily switch between attachment of the adhesive and detachment.

Figure 6:
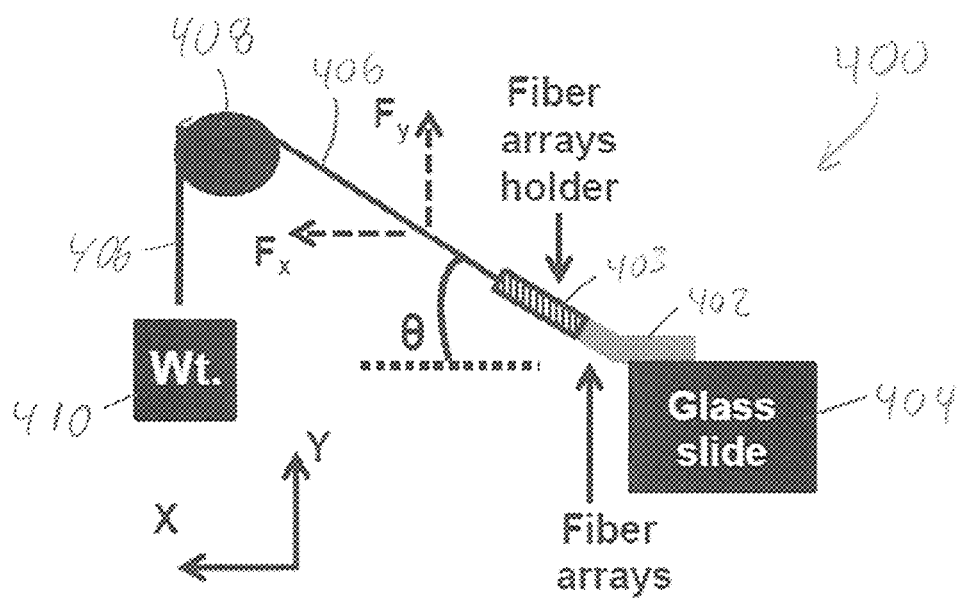
FIG. 6 is a general schematic of an apparatus and test method for testing the shear adhesion strength.

With reference to FIG. 6, an apparatus for assessing the shear adhesion of the non-wovens is shown and designated by the numeral 400. The non-woven 402 is secured to a fiber holder 403 and is press applied to the surface of an adherend 404 (glass side shown as an example only) such that a portion thereof extends off of the surface so that the overhanging portion can be pulled at a desired angle. A suitably strong string or cable 406 extends from the holder 403, over a pulley 408 positioned so as to pull the non-woven at a desired angle θ creating a shear vector Fx and a normal vector Fy (for angles between 0 and 90). An adjustable weight 410 is secured to the opposite end of the cable 406 so as to be incrementally increased until there is an adhesion failure or break of the non-woven. In particular embodiments, the weight 410 is a container that receives liquid so as to be varied in weight. Liquid is slowly and continually added and the total weight of the container and liquid therein can be determined after failure.

Figure 14:
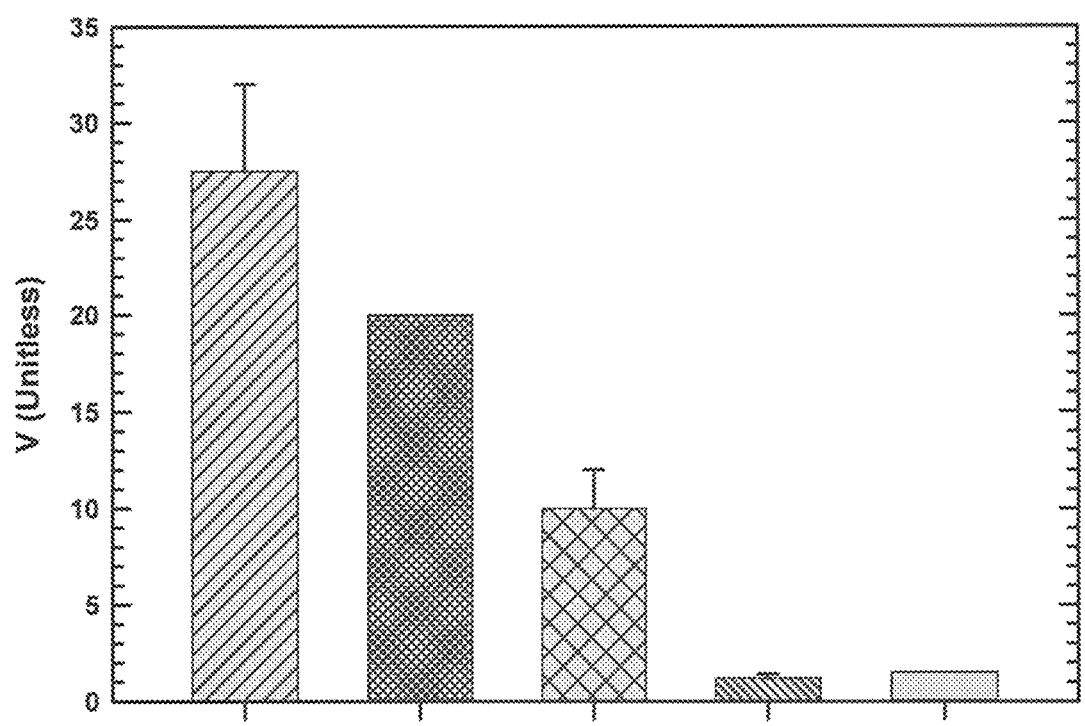
FIG. 14 is bar graph comparing the adhesion of an example of the present invention (nylon 6 non-woven) to some common prior art, including gecko feet, Scotch™ brand tape, carbon nanotubes and PUA.

Referring to FIG. 14, a bar graph is provided to compare the adhesion of an example of the present invention to some common prior art. The vertical axis is a unitless property V, calculated through the process of FIG. 6, with V being the adhesion strength at θ of 0 degrees divided by the adhesion strength at θ of 30 degrees. This provides a unitless comparison of shear and normal adhesion, in that pulling at 0 degrees is pure shear adhesion, while pulling at 30 degrees tests both shear and normal adhesion. The left-most bar represents a nylon 6 non-woven of aligned nanofibers in accordance with this invention having a thickness of 30 microns with fibers of a diameter of 50 nm. From left to right, the additional bars represent gecko setae, common Scotch™ brand tape, carbon nanotube arrays and polyurethane acrylate (PUA) nanofibers. The present invention is found to provide great shear adhesion with a low normal adhesion such that non-wovens in accordance with this invention provide strong shear adhesion, while being readily removed from surfaces in a normal or peel direction.

Figure 12:
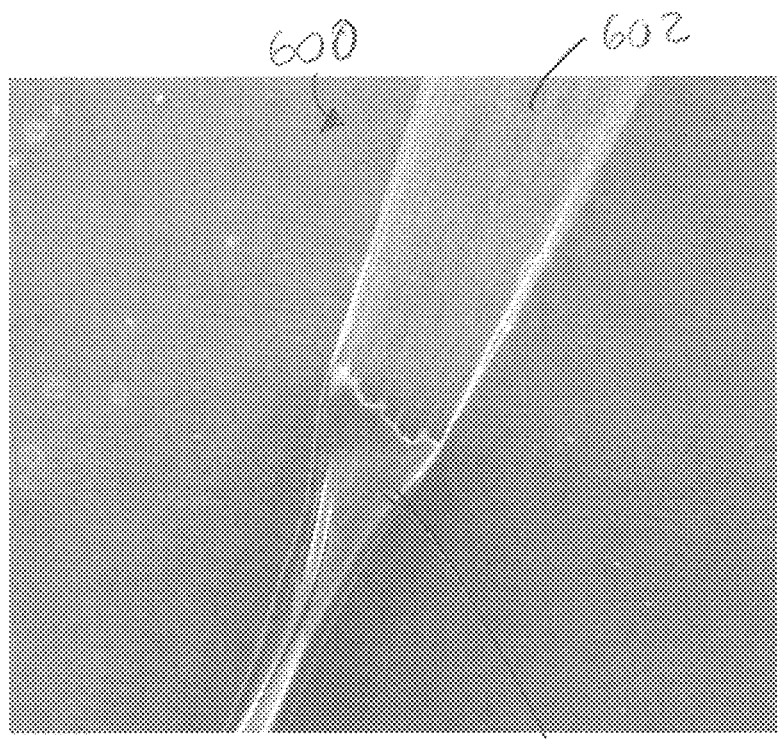
FIG. 12 is an image of a hierarchical structure in accordance with this invention with non-woven aligned fibers extending from and supported by a polycarbonate base.
Figure 13:
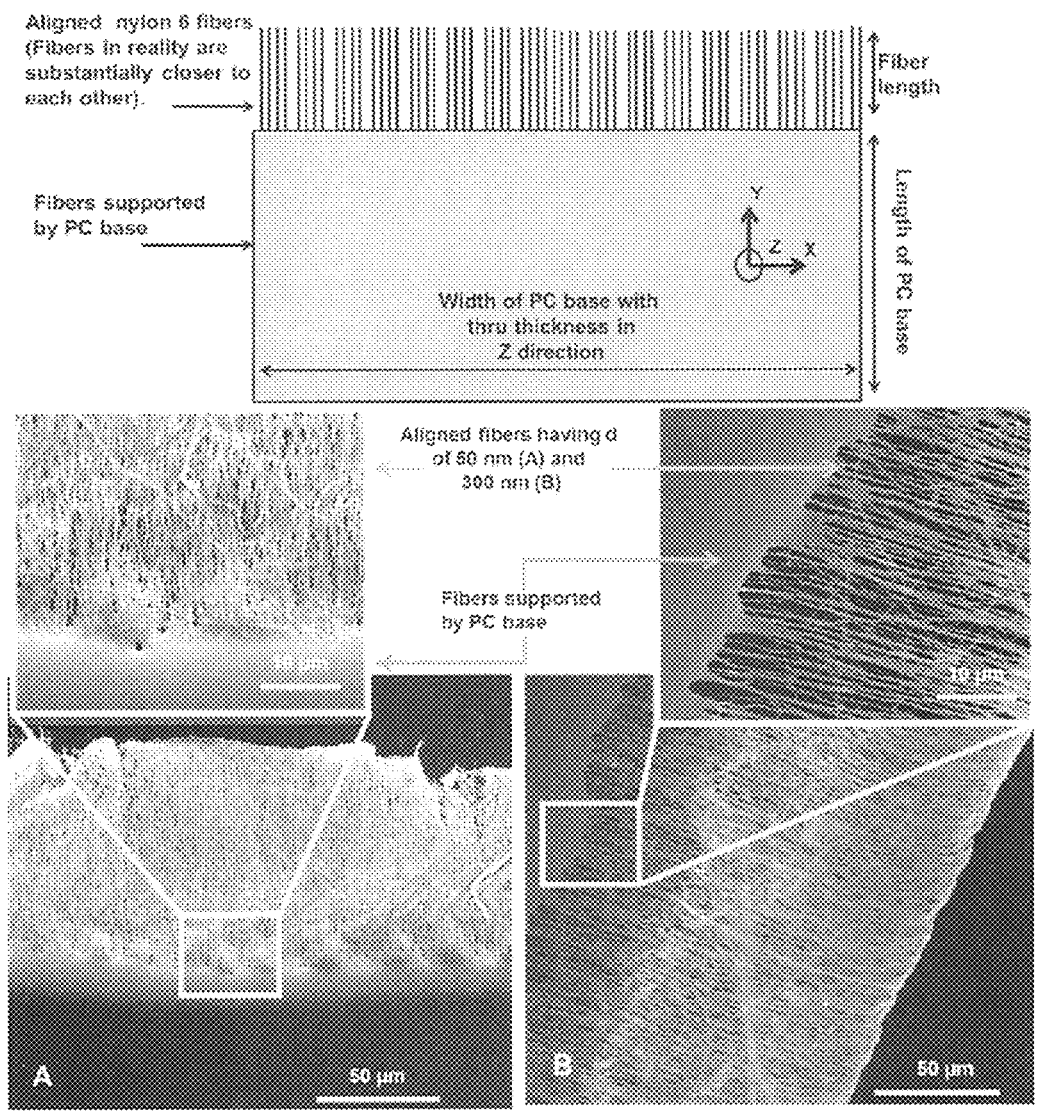
FIG. 13 provides a schematic representation and specific images of similar hierarchical structures with non-woven aligned fibers extending from and supported by a polycarbonate base.

In some embodiments, the non-woven of aligned nanofibers can be incorporated into base structures to form hierarchical structures. For example, in FIG. 12, a hierarchical structure is shown and designated by the numeral 600. The hierarchical structure 600 includes a non-woven 602 in accordance with this invention extending from a base 604. Although any desired process for securing the non-woven to a larger base structure can be practiced, in some embodiments, an end of the non-woven 602 is placed in a settable material, such as a polycarbonate, while flowable, and thereafter the settable material is set to solidify and secure the non-woven extending therefrom in a hierarchical manner. Notably, this structure mimics hierarchical structures of fine fibrils like those on insects' and lizards' feet, the non-woven being similar to the spatulae and the base being similar to the seta. FIG. 13 shows a schematic and electron microscope images of similar hierarchical structures with non-woven aligned fibers extending from and supported by a polycarbonate base.

The dry adhesives formed using methods of the present invention achieve their adhesive properties through creation of nanoscale contact points. In some embodiments, tens of millions of nanoscale contact points are achieved. The alignment of fibers increases the adhesive properties of the dry adhesives. If the fibers are not aligned, they tend to stack randomly on top of each other and eliminate nanoscale contacts with the surface of the adherend.

In a specific embodiment using electrospun nylon 6 non-woven, a shear adhesion strength of about 27 N/cm$^2$ was achieved when testing with a glass slide. In this same embodiment, this measured value of the shear adhesion strength was about 97 times higher than the normal adhesion strength. These results indicate that the dry adhesive possesses strong shear binding-on and easy normal lifting-off In one or more embodiments, the non-woven forming the dry adhesive as disclosed above is plastically deformed in order to further tailor the adhesive properties. To distinguish the resultant product from the non-woven dry adhesive described above it is termed herein a non-woven substrate. Plastic deformation of the non-woven dry adhesive results in the formation of microprotrusions on the surface of the resultant non-woven substrate. As the nanofibers pass through the extrusion die their nano-morphology is further refined by severe plastic deformation. The nano-morphology is refined in order to provide the protruding microprotrusions with the original nanofiber texture being preserved.

The non-woven dry adhesive may be subject to severe plastic deformation through ball milling, torsion straining under quasi-hydrostatic pressure, equal-channel angular pressing and multiple forging. Suitable plastic deformation can also be achieved by simple pressing of the substrate between surfaces.

Figure 5:
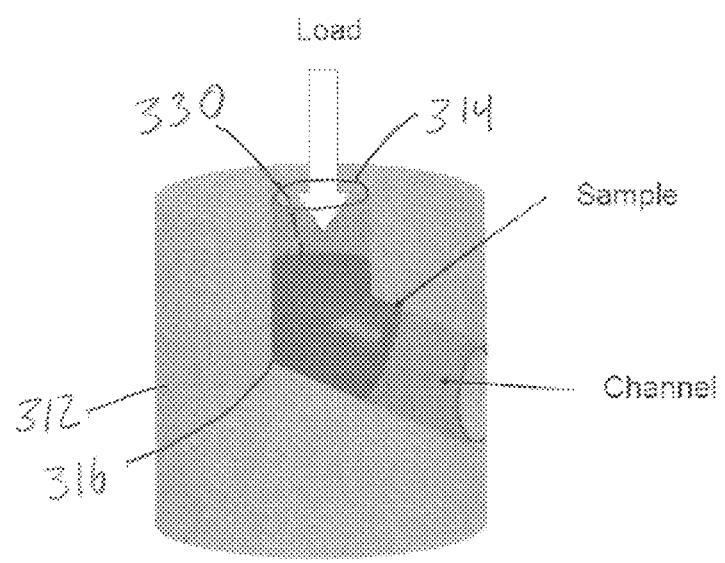
FIG. 5 shows a general schematic of an equal channel angular pressing method.

Referring now to FIG. 5, an equal channel angular pressing method is shown. An equal channel angular extrusion vial 312 includes a channel 314 including a corner 316. The cross section of the channel 314 is equal on entry and exit. The non-woven dry adhesive 330 is forced through the channel 314 and is subjected to high strain plastic deformation as it is forced around the corner 316. The plastic deformation creates micro- or nano-protrusions (herein broadly referred to as microprotrusions) in the form of fibrillar lamellar bundles tend to orient approximately along the extrusion direction. Since the electrospinning preferably produces a continuous single fiber with one discharge of electrified solution, the aspect ratio of microprotrusions thus formed are governed by the geometry of the equal channel angular press and the number of cycles through the press. The higher the number of cycles the higher the aspect ratio of the nano- and micro-protrusions.

In one or more embodiments, the aligned nanofibers are electrospun from a blend of polymers comprising a highly spinnable component and an adhesive component. The adhesive component is chosen to provide selected adhesion capability in certain embodiments. The adhesive component impacts the intermolecular interactions such as van der Waals forces, such that these interactions are further augmented by the adhesive nature of the low modulus viscous component that conforms to surface asperities and thus enhances the adhesion between the two surfaces. The adhesive component is broadly a viscoelastic and/or a resin-curable component. In some embodiments, the low modulus viscous component is flowable at room temperature.

In one or more embodiments, the adhesive component has a Young's modulus of less than 0.1 GPA (gigapascal). In other embodiments, the adhesive component has a Young's modulus of 0.1 GPA or less, in other embodiments 0.075 GPA or less, in other embodiments 0.05 GPA or less, in other embodiments 0.03 GPA or less, in other embodiments 0.02 GPA or less, in other embodiments 0.01 GPA or less, in other embodiments 0.005 GPA or less, in other embodiments 0.001 GPA or less.

In embodiments comprising an adhesive polymeric component, the adhesive polymeric component is added in order to improve the shear adhesion of the resulting non-woven. The adhesive properties of electrospun fibers can be fine tuned by solution blending techniques that are well known in the art.

In one or more embodiments, the adhesive component is polyisobutylene, Polyisobutylene, also known as "PIB" or polyisobutene, $(C_4H_8)n$, is the homopolymer of isobutylene, or 2-methyl-1-propene, on which butyl rubber is based. Structurally, polyisobutylene resembles polypropylene, having two methyl groups substituted on every other carbon atom. Polyisobutylene is a colorless to light yellow viscoelastic material. It is generally odorless and tasteless, though it may exhibit a slight characteristic odor.

In one or more embodiments, the adhesive component is a material typically suitable as a pressure sensitive adhesive. A pressure sensitive adhesive (PSA, self adhesive, self stick adhesive) is an adhesive that forms a bond when pressure is applied to marry the adhesive with the adherend. No solvent, water, or heat is needed to activate the adhesive. PSA's are usually based on an elastomer compounded with a suitable tackifier (e.g., a rosin ester). In one or more embodiments, the pressure sensitive adhesive elastomer is chosen from acrylics, butyl rubber, ethylene-vinyl acetate (EVA) with high vinyl acetate content, natural rubber, nitriles, silicone rubbers, styrene block copolymers (SBC), styrene-butadiene-styrene (SBS), styrene-ethylene/butylene-styrene (SEBS), styrene-ethylene/propylene (SEP), styrene-isoprene-styrene (SIS), vinyl ethers, and mixtures thereof.

In one or more embodiments, an electrospun solution includes a tackifier. Tackifiers are chemical compounds used in formulating adhesives to increase the tack, the stickiness of the surface of the adhesive. They are generally low-molecular weight compounds with high glass transition temperature. At low strain rate, they provide higher stress compliance, and become stiffer at higher strain rates. Tackifiers are generally resins (e.g. rosins and their derivates, terpenes and modified terpenes, aliphatic, cycloaliphatic and aromatic resins (C5 aliphatic resins, C9 aromatic resins, and C5/C9 aliphatic/aromatic resins), hydrogenated hydrocarbon resins, and their mixtures, terpene-phenol resins (TPR, used often with ethylene-vinyl acetate adhesives)). The tackifier can be dissolved in solvents prior to electrospinning and therefore integrated with the spinnable material.

In some embodiments, the adhesive component is cynoacrylate or polyacrylate.

The adhesive component and spinnable polymer are mixed in an appropriate solvent to produce a solution suitable for spinning. In one or more embodiments, the adhesive component is present in an amount from 1 wt % or more to 5 wt % or less, based upon the total weight of the spinnable material. The adhesive component, when present, is blended in the spinnable material solution prior to electrospinning. The spinnable material is used as a carrier for the adhesive component.

Based on the above, the stickiness, dryness and tackiness can be fine tuned during the solution blending process.

In one or more embodiments, the adhesive component results in a non-woven having an adhesion energy of 200 mJ/m$^2$ or higher. In other embodiments, the adhesive component results in a non-woven having an adhesion energy of 300 mJ/m$^2$ or higher.

In one or more embodiments, the adhesive component results in a non-woven having an shear adhesion strength of 22 N/cm$^2$ or higher. In other embodiments, the adhesive component results in a non-woven having an shear adhesion strength of 27 N/cm$^2$ or higher.

The suitable adhesive portion could be dissolved in the same solvents which are used to dissolve the spinnable polymer. The adhesive component only constitutes 0-5 wt % of the total mixtures. The content should be low enough not to interfere with the spinnability of the major component as a solution for electrospinning.

Solvents that are particularly beneficial for dissolving adhesive polymers include toluene, THF, DCM, chloroform, methanol, DMAC, DMSO, DMF, and xylene.

Figure 7:
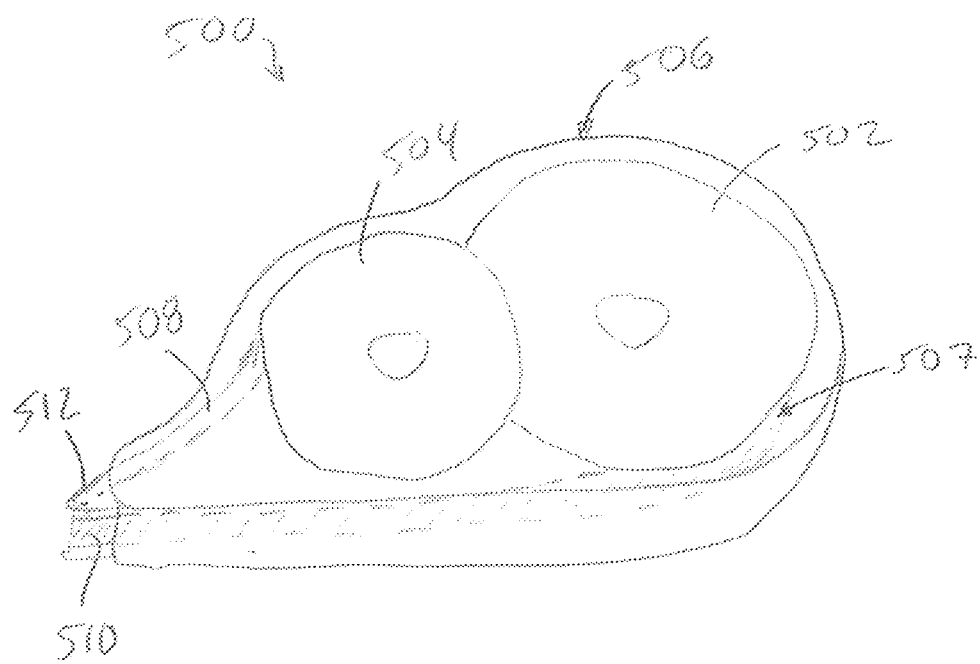
FIG. 7 shows an embodiment of an applicator for adhering non-wovens of aligned nanofibers in accordance with this invention to an adherend.

In a particular embodiment, the non-wovens of this invention, whether with or without an adhesive polymer component forming part of the nanofibers, are woven onto a release substrate on the collector. Thus, the non-woven can be peeled off of the release substrate and pressed onto the surface of an item for adhesion thereto and, if desired, for further adhesion of that item to another surface. With reference to FIG. 7, in particular embodiments, the non-wovens are part of an applicator 500 having a dry adhesive supply spool 502 and a release substrate take-up spool 504 held in an applicator body 506. The dry adhesive supply spool 502 carries a spooled supply 507 of release substrate 508 coated with a non-woven 510 in accordance with the disclosures above. The spooled supply 507 extends from the spool 502 over an applicator tip 512 and then is secured to the take-up spool 504. The non-woven is the outermost layer such that as the spooled supply 507 extends over the applicator tip 512, the release substrate 508 is against the tip 512 and the non-woven 510 is exposed. Thus, the applicator tip 504 can be used to press the non-woven 510 against the surface of an item 514, where the non-woven will stick for reasons described herein. Movement of the applicator body 506 leaves behind a line of non-woven 510, which peels off of the release substrate 508, the supply spool 502 rotating as the spooled supply 507 is pulled off. The take-up spool 504 and supply spool 502 are geared together such that the take-up spool 504 takes up the release substrate 508. These general applicators are known in the art of liquid paper application for correcting typographical errors and the like.

Developing reusable materials with higher friction coefficient (0 and shear adhesion strength also has the potential of use in several applications such as treads of wall-climbing robots, high-friction gloves, and fasteners.

In a specific embodiment, the polymeric material is PVDF, the solvent is a combination of DMF and acetone and the concentration of the polymeric material is 0.17 g/mL. In another specific embodiment, the polymeric material is PVA, the solvent is a combination of DMSO and ethanol, and the concentration of the polymeric material is 0.19 g/mL. In another specific embodiment, the polymeric material is PVDF, the solvent is a combination of DMF and acetone, and the concentration of the polymeric material is from 0.15 g/mL to 0.20 g/mL. In another specific embodiment, the polymeric material is PCL, the solvent is a combination of CHCl3 and DMF, and the concentration of the polymeric material is 0.12 g/mL.

In another specific embodiment, the polymeric material is Nylon 6, the solvent is formic acid, and the percentage of the polymeric material is from 12.5 wt % to 22.5 wt %. In another specific embodiment, the polymeric material is PCL, the solvent is a combination of DCM and DMF, and the percentage of the polymeric material is from 12 wt % to 14 wt %. In another specific embodiment, the polymeric material is PVDF, the solvent is a combination of DMF and acetone, and the percentage of the polymeric material is 15 wt %.

In another specific embodiment, the polymeric material is Nylon-6,6, the solvent is a combination of formic acid and DCM, and the percentage of the polymeric material is from 12 wt % to 20 wt %. In another specific embodiment, the polymeric material is a combination of Nylon-6,6 and PA-6,6, the solvent is formic acid, and the percentage of the polymeric material is 10 wt %. In another specific embodiment, the polymeric material is polyurethane, the solvent is dimethyl formamide, and the percentage of the polymeric material is 10 wt %.

In another specific embodiment, the polymeric material is polybenzimidazole, the solvent is dimethyl formamide, and the percentage of the polymeric material is 10 wt %. In another specific embodiment, the polymeric material is PBI, the solvent is dimethyl acetamide, and the percentage of the polymeric material is 10 wt %. In another specific embodiment, the polymeric material is polycarbonate, the solvent is a combination of dimethyl formamide and tetrahydrofuran, and the percentage of the polymeric material is 10 wt %. In another specific embodiment, the polymeric material is polycarbonate, the solvent is dichloromethane, and the percentage of the polymeric material is 15 wt %.

In another specific embodiment, the polymeric material is polyacrylonitrile, the solvent is dimethyl formamide, and the percentage of the polymeric material is 15 wt %. In another specific embodiment, the polymeric material is polyvinyl alcohol, the solvent is distilled water, and the percentage of the polymeric material is from 1-16 wt %. In another specific embodiment, the polymeric material is polylactic acid, the solvent is dichloromethane, and the percentage of the polymeric material is 5 wt %.

In another specific embodiment, the polymeric material is polyethylene oxide, the solvent is distilled water, and the percentage of the polymeric material is from 4-10 wt %. In another specific embodiment, the polymeric material is polyethylene terephthalate, the solvent is a combination of dichloromethane and trifluoroacetic acid, and the percentage of the polymeric material is from 12-18 wt %. In another specific embodiment, the polymeric material is polystyrene, the solvent is tetrahydrofuran, and the percentage of the polymeric material is 25 wt %.

In another specific embodiment, the polymeric material is polyvinylphenol, the solvent is tetrahydrofuran, and the percentage of the polymeric material is from 20-60 wt %. In another specific embodiment, the polymeric material is polyvinylchloride, the solvent is a combination of tetrahydrofuran and dimethylformamide, and the percentage of the polymeric material is from 10-15 wt %. In another specific embodiment, the polymeric material is cellulose acetate, the solvent is a combination of acetone, acetic acid, and dimethylacetamide, and the percentage of the polymeric material is from 12.5-20 wt %.

In another specific embodiment, the polymeric material is poly(vinylidene fluoride), the solvent is a combination of dimethylformamide and dimethylacetamide, and the percentage of the polymeric material is 20 wt %. In another specific embodiment, the polymeric material is polyether imide, the solvent is hexafluoro-2-propanol, and the percentage of the polymeric material is 10 wt %. In another specific embodiment, the polymeric material is polyethylene glycol, the solvent is chloroform, and the percentage of the polymeric material is from 0.5-30 wt %. In another specific embodiment, the polymeric material is poly(ferrocenyldimethylsilane), the solvent is a combination of tetrahydrofuran and dimethylformamide, and the percentage of the polymeric material is 30 wt %.

In light of the foregoing, it should be appreciated that the present invention significantly advances the art by providing improved methods of forming dry adhesives from electrospinning spinnable materials and by providing dry adhesives with high shear adhesion strength and low normal detachment. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

With use of electrospun nylon 6 nanofiber membrane, dry adhesives are fabricated with high shear adhesion strength for strong shear binding-on but with substantial normal detachment strength (V) for easy normal lifting-off. With the aid of microscopy and microanalyses, the effects of the fiber diameter, fiber surface roughness, and thickness of membrane on their corresponding adhesion strengths are investigated. It is found that the stiffness of fiber fabrics and dimensional characteristics play a critical role in optimizing the van der Waals interactions and thus the shear adhesion strength between electrospun nylon 6 and surface asperities.

Collection Of Aligned Electrospun Fibers

Nylon 6 pellets (Sigma Aldrich, CAS 25038-54-4) are dissolved in formic acid (EMD Corporation, CAS 64-18-6) and magnetically stirred overnight. A syringe pump is employed for maintaining a solution drop on the tip of a stainless steel needle (Gauge 24). The latter needle is attached to a 5 mL capacity syringe filled with the solution. The needle is charged with a high voltage of 25 kV. The gap distance between the tip of the needle and the top of rotating disc collector is set to be 150 mm. Collector has a diameter of 150 mm and electrospun fibers are collected at take-up velocity of 20 m/s.

Fabrication Of High AR Nanofiber Membrane

After collecting electrospun fibers for 10 minutes, a portion of the membrane is discarded to prepare the surface of the collector for peeling. A small part of the membrane is then placed on a glass slide using the tapered tip of a needle. The glass slide is thereafter rotated in the plane where membranes overlap one another. Subsequently, membranes with substantial thickness are obtained. These membranes are then installed in a holder.

Atomic Force Microscopy (AFM)

Contact-mode AFM is performed for investigating the elastic modulus of fiber E. A contact-mode probe (Veeco Inc.), with a tip radius of 12 nm and a cantilever spring constant of 0.125 N/m, is employed. The diameter and surface roughness of fibers are determined using tapping-mode AFM. A tapping-mode probe (MikroMasch Inc.), with a tip radius of 10 nm and a cantilever spring constant of 40 N/m, is employed. Scanning is done at a frequency of 0.5 Hz and data are analyzed by employing SPI3800N probe station software (Seiko, Inc.). Surface roughness of the nanofiber is obtained by tracing a line along the fiber axis. An average roughness of the fiber surface is determined Macroscopic Adhesion Testing Nanofiber membrane is finger-pressed on a glass slide and then the weight is added to the end of the line. The weight consists of a beaker which is incrementally filled with water until membranes get separated from the glass slide. The contact area between membrane and a glass slide has a width and a length of 3 mm and 2 mm, respectively. The only two parameters which vary are membrane thickness and nanofiber diameter. No external normal load is applied to the membrane while being tested.

Effects Of Membrane Thickness (T) On Shear Adhesion

Figure 4A:
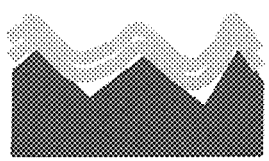
FIG. 4A generally shows nanofibrous membranes studied at section A of FIG. 4, showing considerable flexibility with a weak tensile strength for T less than 12 μm.
Figure 4B:
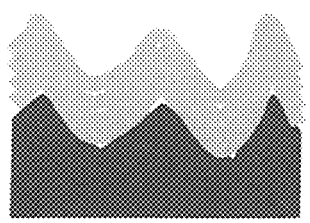
FIG. 4B generally shows nanofibrous membranes studied at section B of FIG. 4, showing that flexibility and tensile strength of membranes reach optimum performances for T between 30 and 40 μm.
Figure 4C:
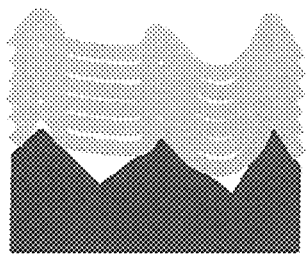
FIG. 4C generally shows nanofibrous membranes studied at section C of FIG. 4 and that these nanofibrous membranes start losing their flexibility for T greater than 40 μm.

As shown in FIG. 4, nanofiber membrane displays low shear adhesion strengths for T less than 12 µm. However, for T ranging between 15 µm and 40 µm, the shear adhesion strength of nanofiber arrays substantially increases with rising T and reaches peak values. For T greater than 40 µm, the shear adhesion strength of membrane is significantly reduced with increasing T and reaches considerably low values above T of 80 µm. Shear adhesion testing is performed at an angle θ of 0° with the glass slide. The highest shear adhesion strength of 27 N/cm2 is reached for membranes having fibers with d of 50 nm and T of 30-40 µm. A glass beaker is filled with water (total weight of 170 g, shear adhesion strength of 28.3 N/cm2) and carried by a small piece of membrane (3 mm by 2 mm) This shear adhesion strength is 415% greater than the one reported for PC nanofiber-based dry adhesives. As shown in FIG. 4A, nanofibrous membranes may be considerably flexible with a weak tensile strength for T less than 12 µm. Subsequently, these membranes are expected to retain a minimal real contact area with a substrate. Thus, the latter membranes have limited van der Waals (vdW) interactions and hence could not carry a heavy load. Nevertheless, as presented in FIG. 4B, it is suggested that the flexibility and tensile strength of membranes reach optimum performances for T between 30 and 40 µm. Thus, membranes retain a significant real contact area with the glass substrate during loading, which leads to a substantial shear adhesion strength. However, as shown in FIG. 4C, it is proposed that nanofibrous membranes start losing their flexibility for T greater than 40 µm. This phenomenon causes an extensive decrease in the real contact area between the fibers and the glass slide leading to deteriorating shear adhesion strength.

Figure 8:
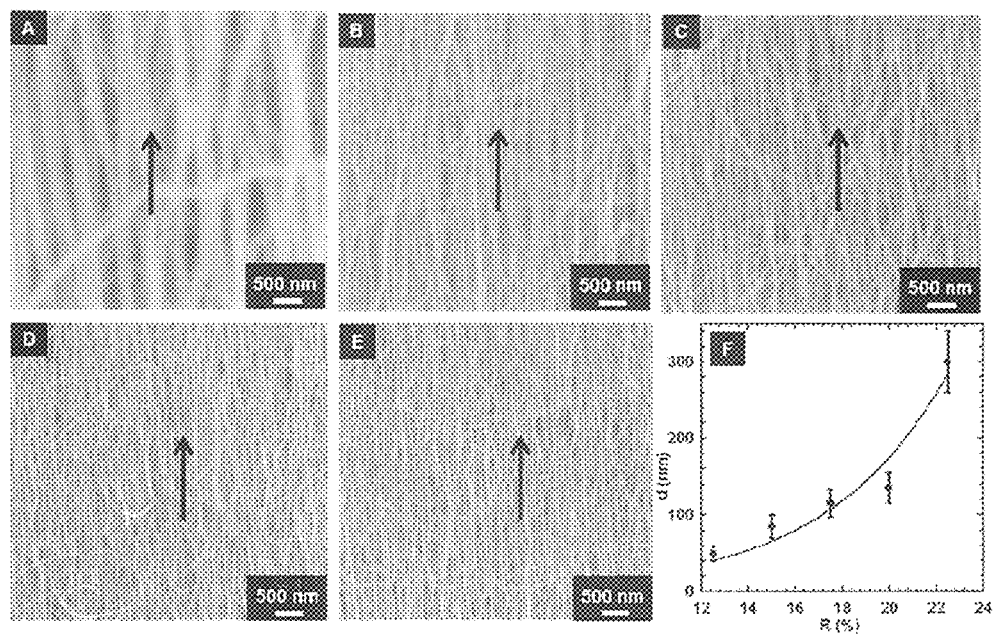
FIG. 8A-E are scanning electron microscopy (SEM) images of electrospun nylon 6 fibers with different d's (300 nm, 135 nm, 115 nm, 85 nm, and 50 nm, respectively)
FIG. 8F is a graph showing d as a function of R.

Effects of Fiber Packing Density, Nanofiber Diameter (d) and Fiber Surface Roughness on Adhesion As shown in FIG. 8 (A-E), the packing density and aspect ratio of fibers are both noticeably enhanced with decreasing d. This enhancement is suggested to augment vdW interactions between the fibers and the substrate leading to an upsurge in shear adhesion strength. As shown in FIG. 8F, d extensively diminishes with decreasing concentration of polymer solution (R). The fiber packing density is characterized via SEM (FEI Quanta 200). Theoretical studies have shown that significant adhesion could be obtained by size reduction. Furthermore, the side contact of fibers with a substrate over a large contact area causes significant adhesion.

Surface boundary of fibers also makes contribution to the shear adhesion. For side wall contacts of fibers, the attractive force per unit length between the nanofiber and substrate is:

$$F_v = A\sqrt{d}/(16D^{2.5})$$

where A is the Hamaker constant, and D the gap distance between the surface of the nanofiber and the substrate. There exists a cut-off gap distance $D=D_0$ which represents the effective separation between the nanofiber and substrate and at which the maximum Fv (FvM) is estimated. The total FvM is:

$$F_{vmK} = NLA\sqrt{d}/(16D_0^{2.5})$$

where N represents the total number of fibers along the contact width between the nanofiber arrays and the substrate (W) and is N=W/d. Replacing the value of N in the previous equation, we obtain:

$$F_{vMK} = LWA/(16D_0^{2.5}\sqrt{d})$$

For constant values of W and the contact length between the nanofiber arrays and the substrate (L), FvMK radically increases with decreasing d. These results suggest a substantial increase in the shear adhesion strength with diminishing d.

Figure 9:
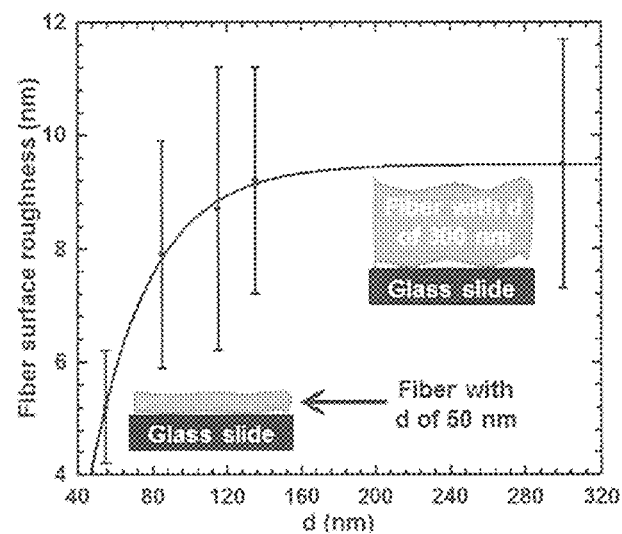
FIG. 9 is a graph showing the surface roughness of a nanofiber as a function of d.

As shown in FIG. 9, the surface roughness of fibers considerably diminishes with decreasing d. The latter decrease leads to a significant enhancement in shear adhesion strength between membrane and a substrate due to a considerable proliferation in the effective contact area.

Normal Adhesion Force

Membranes are easily peeled off a glass slide for θ=90°. For a contact area of (3×2) mm2 with a glass slide, the normal adhesion force of the membranes is roughly 0.015 N, regardless of d and T. Meanwhile, the maximum shear adhesion force for nanofiber arrays is 1.6 N (Fibers with d of 50 nm) which leads to a V=100. Thus, these nylon 6 fiber membranes are 10 times easier to detach from a glass slide in the normal direction dry adhesives. This significant V value is suggested to be due to the high AR of the nanofibers.

Figure 10:
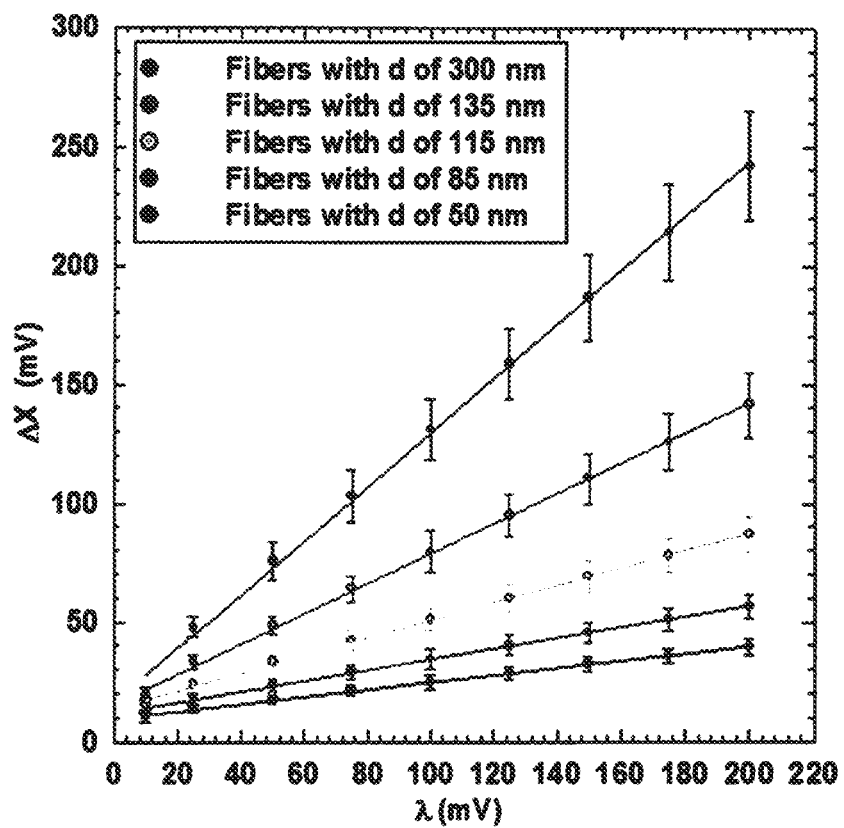
FIG. 10 is a graph showing ΔX as a function of λ for fibers with varying d.

Thus, a significant decrease in the effective contact area between the nanofibers and the substrate arises during vertical detachment, which leads to an easy normal lifting-off Effect Of Nanofiber Bending Stiffness On Adhesion The bending stiffness of a nanofiber is b=EI where I is the moment of inertia of the cross section of a nanofiber. The indentation of a cantilever tip into the nanofiber is directly proportional to lateral deflection of the cantilever ($\Delta X$). According to the Hertz model, $\Delta X$ is defined as:

$$h=[2(1-v^2)f/4a^{0.5}E]^{2/3}$$

where a is the AFM probe tip radius, v the Poisson's ratio of the tested material, and f the applied normal load on a fiber. f is directly proportional to a sinusoidal drive signal ($\lambda$). As shown in FIG. 10, $\Delta X$ continuously rises with increasing $\lambda$. Fibers with d of 300 nm display the largest slope (P). Fibers with d of 50 nm possess the smallest P where the latter is directly proportional to E. P of fibers with d of 300 nm (Po) is taken as a reference value for determining the relative modulus of a fiber:

$$E_r=P/P_0.$$

Figure 11A:
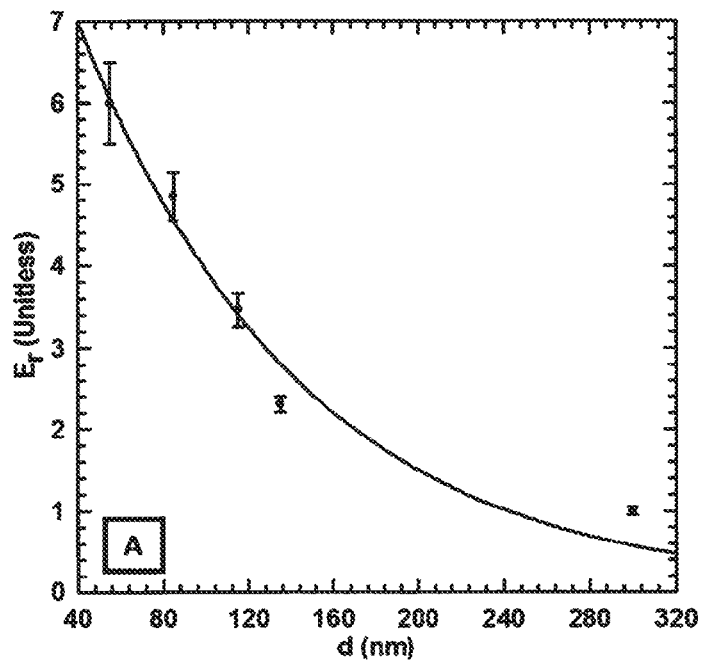
FIG. 11A is a graph showing $E_r$ as a function of d.

As shown in FIG. 11A, Er for fibers with d of 50 nm is 6-fold above the one for fibers with d of 300 nm. This upsurge is mainly caused by the increase in molecular orientation during electrospinning and nanofiber collection when d diminishes. Thus, it becomes more difficult for the tip of an AFM probe to penetrate deeper in the polymer chains of a fiber leading to a smaller $\Delta X$ value for a specific $\lambda$ value. Assuming that a nanofiber has a circular cross section:

$$I=\pi d^4/64$$

The relative moment of inertia is:

$$I_r=I/I_0=(d/d_o)^4$$

Where d0 is 300 nm and I0 is I for d0. The relative bending stiffness is:

$$b_r=E_rI_r$$

and thus:

$$b_r=E_r(d/d_0)^4$$

Figure 11B:
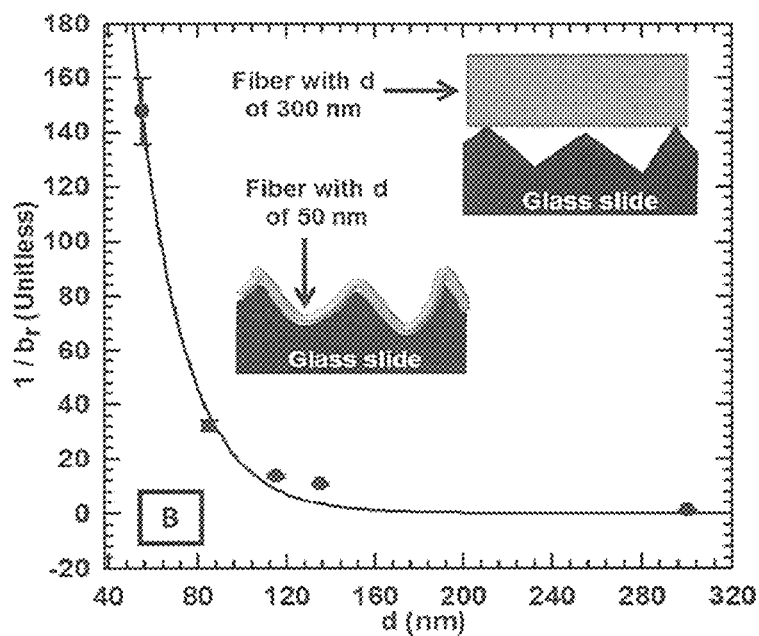
FIG. 11B is a graph showing $1/b_r$ as a function of d.

As shown in FIG. 11B, 1/br significantly rises with decreasing d for fibers with d less than 120 nm. Fibers with d of 50 nm are 150 times more flexible than the ones with d of 300 nm. As shown in insets of FIG. 11B, this noteworthy flexibility is suggested to cause a substantial enhancement in the real contact area between a nanofiber and a glass slide. This enhancement could play a critical role to significantly increase the shear adhesion strength between a nanofiber and a glass slide.

The forgoing provides a technique for fabricating electrically insulating dry adhesives from electrospun nylon 6 nanofibers. These adhesives possess shear adhesion strength as high as 27 N/cm2 on a glass slide. This measured value is 97-fold above normal adhesion strength of the same adhesive. For a definite d, the shear adhesion strength of membranes reaches optimum values for a specific range of arrays thicknesses while deteriorating otherwise. These optimum values suggest that these arrays could retain a significant real contact area with the substrate during loading. Fiber bending stiffness and fiber packing density are significantly increased with decreasing d while fiber surface roughness is noticeably reduced. These enhancements are proposed to considerably increase the shear adhesion strength between a nanofibrous membrane and a glass slide.

The drastic increase is mainly attributed to a sizeable proliferation in van der Waal forces with enhanced contact area. This finding enables the creation of electrically insulating dry adhesives with a strong shear adhesion and relatively weak normal adhesion for easy detachment Various modifications and alterations that do not depart from the scope and spirit of this invention will become apparent to those skilled in the art. This invention is not to be duly limited to the illustrative embodiments set forth herein.

What is claimed is:

1. A method for producing a dry adhesive, the method comprising the steps of:
   providing a spinnable material;
   electrospinning the spinnable material to thereby form a non-woven dry adhesive, wherein the non-woven dry adhesive comprises polymeric nanofibers, where said polymeric nanofibers are substantially aligned in a parallel alignment.

2. The method of claim 1, wherein the spinnable material is a solution of a polymeric material and a solvent.

3. The method of claim 2, wherein the polymeric material is selected from the group consisting of polyurethanes, polycaprolactones, polyvinyl alcohols, poly(vinyldiene fluoride)s, polyamides, polybenzimidazoles, polycarbonates, polyacrylonitriles, polylactic acids, polyethylene oxides, polyethylene terephtalates, polystyrenes, polyvinylphenols, polyvinylchlorides, cellulose acetates, polyether imides, polyethylene glycols, poly(ferrocenyldimethylsilane)s and mixtures thereof.

4. The method of claim 2, wherein the solvent is selected from the group consisting of toluene, tetrahydrofuran, dichloromethane, chloroform, methanol, dimethylacetamide, dimethyl sulfoxide, dimethylformamide, xylene, acetone, ethanol, formic acid, distilled water, trifluoroacetic acid, hexafluoro-2-propanol and mixtures thereof.

5. The method of claim 2, wherein the solution further includes an adhesive component, the adhesive component being a viscoelastic or a resin-curable component.

6. The method of claim 5, wherein the adhesive component has a Young's modulus of 0.1 GPA or less.

7. The method of claim 6, wherein the adhesive component is flowable at room temperature.

8. The method of claim 5, wherein the adhesive component is selected from the group consisting of polyisobutylenes, pressure sensitive adhesive materials and tackifiers.

9. The method of claim 5, wherein the adhesive component is selected from the group consisting of polyisobutylene, acrylics, butyl rubber, ethylene-vinyl acetate (EVA) with high vinyl acetate content, natural rubber, nitriles, silicone rubbers, styrene block copolymers (SBC), styrene-butadiene-styrene (SBS), styrene-ethylene/butylene-styrene (SEBS), styrene-ethylene/propylene (SEP), styrene-isoprene-styrene (SIS), vinyl ethers, and mixtures thereof.

10. The method of claim 5, wherein the adhesive component is selected from the group consisting of rosins, rosin derivates, terpenes, modified terpenes, aliphatic, cycloaliphatic and aromatic resins (C5 aliphatic resins, C9 aromatic resins, and C5/C9 aliphatic/aromatic resins), hydrogenated hydrocarbon resins, terpene-phenol resins (TPR), and mixtures thereof.

11. The method of claim 1, wherein the non-woven dry adhesive has a shear adhesion strength that is higher than the normal adhesion strength.

12. The method of claim 1, wherein the method further comprises the step of subjecting the non-woven dry adhesive to plastic deformation by passing the non-woven dry adhesive through an equal channel angular extrusion vial.

13. The method of claim 1, wherein, in the step of electrospinning, the spinnable material is electrospun onto a surface of a substrate to form the non-woven dry adhesive, and the direction of substantial alignment of the nanofibers is parallel with the surface of the substrate.

14. The method of claim 1, further comprising the steps of adhering the non-woven dry adhesive to an adherend, and further securing the adherend to another surface, wherein the non-woven dry adhesive is reusable, thereby allowing the adherend to be removed from the another surface, wherein when the non-woven dry adhesive is securing the adherend to another surface the direction of substantial alignment of the nanofibers is parallel with the surface of the adherend and the surface of the another surface.

15. The method of claim 1, wherein the non-woven dry adhesive includes millions of substantially aligned polymeric nanofibers.

16. A method for producing a dry adhesive, the method comprising the steps of:
electrospinning a spinnable material to thereby form a non-woven dry adhesive, wherein the non-woven dry adhesive comprises polymeric nanofibers, where said polymeric nanofibers are substantially aligned in a parallel alignment; the non-woven dry adhesive being capable of adhering to the surface of an adherend, the non-woven dry adhesive thereby being capable of securing the adherend to another surface; wherein when the non-woven dry adhesive is securing the adherend to another surface, the direction of substantial alignment of the nanofibers is parallel with the surface of the adherend and the surface of the another surface.

* * * * *